United States Patent
Yan et al.

(10) Patent No.: US 8,236,888 B2
(45) Date of Patent: Aug. 7, 2012

(54) POLYHEDRAL-MODIFIED POLYMER

(76) Inventors: Yuan-Yong Yan, Copley, OH (US);
Jason Poulton, Akron, OH (US);
Xiaorong Wang, Hudson, OH (US);
Hao Wang, Carmel, IN (US); Michelle A. Cottrell, Gainesvill, FL (US)

( * ) Notice: Subject to any disclaimer, the term of this patent is extended or adjusted under 35 U.S.C. 154(b) by 0 days.

(21) Appl. No.: 13/191,737

(22) Filed: Jul. 27, 2011

(65) Prior Publication Data

US 2012/0010355 A1    Jan. 12, 2012

Related U.S. Application Data

(63) Continuation of application No. 11/666,853, filed as application No. PCT/US2005/039913 on Nov. 2, 2005, now Pat. No. 7,999,029.

(60) Provisional application No. 60/624,347, filed on Nov. 2, 2004, provisional application No. 60/643,653, filed on Jan. 13, 2005.

(51) Int. Cl.
*C08L 3/04*    (2006.01)
*C08L 51/10*   (2006.01)

(52) U.S. Cl. ........ 524/528; 524/515; 524/572; 524/577; 525/232; 525/241; 525/333.1; 525/333.2; 525/333.3; 528/480

(58) Field of Classification Search ................. 524/528, 524/515, 572, 577; 525/232, 241, 333.1, 525/333.2, 333.3; 528/480
See application file for complete search history.

(56) References Cited

U.S. PATENT DOCUMENTS

2011/0251357 A1 *  10/2011  Laine et al. ................... 525/478

* cited by examiner

*Primary Examiner* — Robert D. Harlan
(74) *Attorney, Agent, or Firm* — Meredith E. Hooker; David Burleson

(57) ABSTRACT

A macromolecule including a polymer and a polyhedral radical chemically bonded to a terminus of the polymer provides numerous processing and performance advantages. Further functionalization of this macromolecule also is described as being advantageous in certain circumstances. Methods of providing, functionalizing, and utilizing the macromolecule also are provided.

20 Claims, No Drawings

POLYHEDRAL-MODIFIED POLYMER

CROSS-REFERENCE TO RELATED APPLICATIONS

This application is a continuation of patent application Ser. No. 11/666,853, which entered US national stage on Aug. 15, 2007, now U.S. Pat. No. 7,999,029 from international patent application no. PCT/US2005/039913 filed Nov. 2, 2005, which claimed the benefit of U.S. provisional patent application Nos. 60/624,347, filed Nov. 2, 2004, and 60/643,653, filed Jan. 13, 2005.

BACKGROUND INFORMATION

1. Field of the Invention

The invention relates to the manufacture, modification, and use of polymers that can interact with fillers.

2. Background of the Invention

Tire treads, power belts, and the like often are made from compositions that contain one or more elastomers and one or more reinforcing materials such as, for example, particulate carbon black and silica. For a general discussion of this topic, see, e.g., *The Vanderbilt Rubber Handbook*, 13th ed. (1990), pp. 603-04.

Safety and durability considerations mandate that tire treads provide both good traction and resistance to abrasion; however, motor vehicle fuel efficiency concerns argue for a minimization in their rolling resistance, which correlates with a reduction in hysteresis and heat build-up during operation of the tire. The foregoing considerations are, to a great extent, competing and somewhat contradictory: a tire tread composition designed to improve tread traction on the road usually results in increased rolling resistance and vice versa.

Typically, filler(s), polymer(s), and additives are chosen so as to provide an acceptable balance of these properties. Ensuring that constituent reinforcing filler(s) are well dispersed throughout the elastomeric material(s) in such compositions both enhances processability and acts to improve physical properties such as, e.g., compound Mooney viscosity, elastic modulus, tan δ, and the like. Resulting articles made from such compositions can exhibit desirable properties such as reduced hysteresis, reduced rolling resistance, and good traction on wet pavement, snow and ice.

Dispersion of fillers can be improved by increasing their interaction with the elastomer(s) in which they are to be dispersed. Examples of efforts of this type include high temperature mixing in the presence of selectively reactive promoters, surface oxidation of compounding materials, surface grafting, and chemical modifications to terminal ends of the polymers with, e.g., amines, tin compounds, and the like.

Because elastomers used in such compositions often are made via anionic polymerization techniques, attachment of certain functional groups, particularly amines, is difficult. Living polymers are terminated by active hydrogen atoms such as are present in, e.g., hydroxyl groups, thiol groups, and particularly primary and secondary amine groups. This undesired termination can be avoided through use of reaction schemes that allow for attachment of a non-amine N-containing compound followed by conversion to an amine, i.e., indirect attachment schemes.

Rubber articles at times can suffer from the growth of cracks or structural defects due to fatigue of the rubber, often referred to as fatigue crack growth (hereinafter "FCG"). Formation and growth of cracks can play a large role in determining the useful service lifespan of such rubber articles. Efforts to inhibit or reduce FCG tend to focus on provision of elastomers with low crosslink density (which reduces tear energy) and/or inclusion of stiff components in or with the elastomer (which form hard domains that can block propagation of fatigue-induced defects such as cracks).

Additionally, lower molecular weight polymers can be used as processing aids; specifically, they can assist in lowering the mixing viscosity of rubber compounds. Unlike processing oils, lower molecular weight polymers typically do not exude from the rubber matrix and, instead, are incorporated into the vulcanizate. However, lower molecular weight polymers can complicate processing of rubber compounds because of their poor cold flow properties. The use of a coupling agent can alleviate this cold flow deficiency, although one type (such as, e.g., $SnCl_4$) tends break down completely during processing while another (such as, e.g., $SiCl_4$) does not break down at all Continued hysteresis reduction, provision of a direct mechanism for attaching amine functionality to a living polymer, and inhibition of FCG all remain highly desirable.

SUMMARY OF THE INVENTION

In one aspect, the present invention provides a macromolecule that includes a polymer and a polyhedral radical chemically bonded to a terminus of the polymer.

In another aspect is provided a method of making a macromolecule in which a living polymer is allowed to chemically bond with a polyhedral molecule so as to provide a macromolecule.

In a further aspect is provided a composition that includes at least one reinforcing filler and the macromolecule described above.

In yet another aspect is provided a method of making this composition, which is useful for the manufacture of rubber goods. The method includes mixing at least one reinforcing filler with the macromolecule described above.

In a still further aspect is provided a method of inhibiting the growth of fatigue-induced cracking in a rubber article that includes forming a rubber article from the foregoing composition.

In still another aspect is provided a method of directly providing amine functionality to a polymer. The method includes providing a reaction medium in which is reacted a living polymer and a polyhedral molecule so as to provide a functionalized living polymer; quenching the functionalized living polymer so as to provide a functionalized polymer; introducing into the reaction medium a molecule that includes amine functionality, which includes an active hydrogen atom attached to the amino nitrogen atom of the functionality; and allowing the amine group to chemically bond to the polyhedral radical of the functionalized polymer.

In a yet further aspect is provided a method of providing functionality to a polymer. The method includes providing a reaction medium in which is reacted a living polymer and a polyhedral molecule so as to provide a functionalized living polymer; introducing into the reaction medium a molecule that includes at least one heteroatom and that is capable of terminating living polymers; and allowing the introduced molecule to chemically bond to the polyhedral radical of the polyhedral-modified polymer so as to provide a functionalized polymer.

In yet another aspect is provided a macromolecule that includes a plurality of polyhedral-modified polymers. Each of the polymers includes a polyhedral radical chemically bonded thereto at a terminus, and each of the polymers is bonded to or associated with at least one other of the polymer through their respective polyhedral radicals. Optionally, each of the polymers can be bonded to or associated with at least two other of the polymers through their respective polyhedral radicals.

In a further aspect is provided a method for processing rubber compositions. The method employs a composition that includes a macromolecule that includes a plurality of polymers chemically bonded to (i.e., coupled through) a polyhedral radical. The composition is subjected to processing (including, e.g., mixing) during which at least some of the coupled polymers detach from said polyhedral radical. By adjusting the equivalents ratio of initiator to polyhedral, the degree of detachment (i.e., decoupling) can be tailored or controlled.

Other aspects of the present invention will be apparent to the ordinarily skilled artisan from the detailed description that follows. To assist in understanding that description, certain definitions are provided immediately below. These definitions apply hereinthroughout unless a contrary intention is explicitly indicated:

"polymer" means the polymerization product of one or more monomers and is inclusive of homo-, co-, ter-, tetra-polymers, etc.;

"mer unit" means that portion of a polymer derived from a single reactant molecule (e.g., an ethylene mer unit has the general formula —$CH_2CH_2$—);

"homopolymer" means a polymer consisting essentially of a single type of repeating mer unit;

"copolymer" means a polymer that includes mer units derived from two reactants (normally monomers) and is inclusive of random, block, segmented, graft, etc., copolymers;

"interpolymer" means a polymer that includes mer units derived from at least two reactants (normally monomers) and is inclusive of copolymers, terpolymers, tetrapolymers, and the like;

"macromolecule" means an oligomer or polymer;

"terminus" means an end of a constituent chain of a macromolecule;

"terminal moiety" means that portion of a molecule located at its terminus;

"polyhedral" means a compound with many sides include those having a cage-like structure such as, e.g., fullerene, as well as fragments and/or remnants of such cage-like structures;

"radical" means the portion of a molecule that remains after reacting with another molecule;

"chemically bonded" means attached through a bond that is covalent or ionic;

"heteroatom" means an atom other than carbon or hydrogen; and

"hysteresis" means the difference between the energy applied to deform an article made from an elastomeric compound and the energy released as the article returns to its initial, non-deformed state.

DETAILED DESCRIPTION OF ILLUSTRATIVE EMBODIMENTS

The macromolecule includes a polymer and a polyhedral radical chemically bonded to a terminus of the polymer. Certain aspects involve further fractionalization of this macromolecule.

The polymer preferably is elastomeric. Accordingly, the primary chain can include mer units that include unsaturation, which can be mer units derived from polyenes such as dienes and trienes (e.g., myrcene), particularly $C_4$-$C_{12}$ dienes. Preferred are conjugated dienes such as, but not limited to, 1,3-butadiene, isoprene, 1,3-pentadiene, 2,3-dimethyl-1,3-butadiene, and 1,3-hexadiene. Homo- and co-polymers that include just polyene-derived mer units constitute one preferred type of elastomer.

The primary chain also can include mer units that include aromatic pendent groups, e.g., mer units that are derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, these mer can constitute from about 1 to about 50% by wt., preferably from about 10 to about 45% by wt., and more preferably from about 20 to about 35% by wt., of the polymer. Interpolymers of polyene(s) and vinyl aromatic(s) constitute another preferred type of elastomer. Especially when such interpolymers are to be used in compounds intended for the manufacture of tire treads, the resulting interpolymers preferably are random in nature, i.e., each of the respective types of mer units preferably do not form blocks and, instead, are incorporated in a non-repeating, essentially simultaneous, generally random manner.

Incorporation of mer units derived from other ethylenically unsaturated monomers is contemplated. For example, where a Ziegler-Natta or metallocene catalyst is used, vinyl monomers such as α-olefins (e.g., ethylene, propylene, 1-butene, etc.) as well as other alkenes, including those without terminal unsaturation (e.g., 2-butene), can be incorporated into the polymer chain. Other polymerization techniques such as, e.g., carbene, condensation, and free radical processes, can expand the number and types of monomers that can be incorporated.

Particularly preferred elastomers include poly(butadiene), (poly)isoprene (either natural or synthesized), and interpolymers of 1,3-butadiene and styrene such as, e.g., copoly(styrene/butadiene) also known as SBR.

The molecular weight, either number average or weight average, of the polymer preferably is such that a quenched sample will exhibit a gum Mooney viscosity ($ML_4$/100° C.) of from about 2 to about 150.

For some end-use applications, solution polymerization is preferred due to the greater control (with respect to such properties as randomness, microstructure, etc.) afforded compared to, e.g., emulsion polymerization. Solution polymerizations have been performed since the mid-20th century, and the general aspects thereof are known, although some are provided here for convenience of reference. The following is based on a batch process, although extending this description to, e.g., semi-batch or continuous processes is within the capabilities of the ordinarily skilled artisan.

Solution polymerization typically involves an initiator, with a residue of the initiator being incorporated into the resulting polymer. Exemplary initiators include organolithium compounds, particularly alkyllithium compounds. Particular examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

In addition to organolithium initiators, also useful are the so-called functionalized initiators that become incorporated into the polymer chain, thus providing a functional group at the initiated end of the chain. Examples of such materials include the reaction product of organolithium compounds and, for example, N-containing organic compounds (e.g., substituted aldimines, ketimines, secondary amines, etc.)

optionally pre-reacted with a compound such as diisopropenyl benzene; a more detailed description of these materials can be found in, e.g., U.S. Pat. Nos. 5,153,159 and 5,567,815. Additional functionalized initiators that can be used include p-tolyllithium, 4-phenylbutyl-lithium, 4-butylcyclohexyl-lithium, 4-cyclohexylbutyllithium, lithium dialkyl amines, lithium dialkyl phosphines, lithium alkyl aryl phosphines, lithium diaryl phosphines, 1,3,3-trilithio-1-octyne, 1,1,3-trilithio-1,2-butadiene, lithium dialkylaminophenyl dithianes (DAPDT), trialkyl tin compounds, and the like.

Useful anionic polymerization solvents include but are not limited to the various $C_5$-$C_{12}$ cyclic and acyclic alkanes as well as their alkylated derivatives, certain aromatic compounds, and mixtures thereof.

Polyenes can incorporate into polymeric chains in more than one way. Especially where a polymer is to be used in a compound intended for making tire treads, controlling the manner in which the polyene mer units are incorporated into the polymer (i.e., the 1,2-microstructure of the polymer) can be desirable. Based on total polyene content, the overall 1,2-microstructure of a polymer chain preferably is from about 10 to about 80%, more preferably of from about 25 to 65%. In solution polymerizations, randomization as well as vinyl content (i.e., 1,2-microstructure) can be increased through use of a coordinator, usually a polar compound, in the polymerization ingredients. Up to 90 or more equivalents of coordinator can be used per equivalent of initiator, with the amount depending on, e.g., the amount of vinyl content desired, level of non-polyene monomer employed, reaction temperature, and nature of the specific coordinator employed. Useful coordinators include organic compounds having an O or N heteroatom and a non-bonded pair of electrons. Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofuryl)propane, di-piperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in U.S. Pat. No. 4,429,091, the teaching of which relating to the manufacture and use of such materials is incorporated by reference herein.

Although the ordinarily skilled artisan understands the type of conditions typically employed in solution polymerization, a representative description is provided for the sake of convenience to the reader. Polymerization typically begins by charging a blend of the monomer(s) and solvent to a suitable reaction vessel, followed by addition of the coordinator (if used) and initiator, which often are added as part of a solution or blend; alternatively, the monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) is removed and, if no functionalization of the polymer is desired, the resulting polymer removed from the reaction vessel and/or quenched. Quenching typically is conducted by stirring, for up to about 120 minutes at temperatures of from about 30° to 150° C., the polymer and an active hydrogen-containing compound (e.g., an alcohol). Thereafter, solvent is removed by conventional techniques such as drum drying, extruder drying, vacuum drying or the like, which may be combined with coagulation with water, alcohol or steam, thermal desolvation, etc. (If coagulation is performed, oven drying may be desirable.)

Where a functionalized polymer is desired, one or more heteroatom-containing molecules can be reacted with the macromolecule; in the present invention, this is preceded by attachment of a polyhedral radical to a polymer chain. Depending on the desired attachment mechanism, functionalization can be performed prior to or after quenching (i.e., deactivation) of the living polymer.

Useful polyhedrals include, but are not limited to, those multifaceted cyclic molecules that contain at least about 30, and preferably about 60 or more, atoms. Preferred polyhedrals include at least about 60 carbon atoms. Specific examples include fullerenes ($C_{60}$) and fullerites ($C_{70}$), as well as their $C_{76}$, $C_{78}$, and $C_{84}$ homologues, and mixtures thereof.

As the commercial availability of cyclic compounds with cage-like structures has become more widespread, compounds that can be characterized as fragments or remnants of cage-like structures have begun to become available. Examples include, but are not limited to, embodiments described in "Methods for the Chemical Synthesis of Fullerenes," L. T. Scott, *Angew. Chem. Int. Ed*, vol. 43, no. 38, 4994-5007 (2004). Whereas the cage-like structures often are described as being shaped like balls, the shapes of these newer materials can be analogized to bowls or fragments thereof. When made of carbon, these materials, like their counterpart compounds with cage-like structures, involve regularly spaced, interlocking 5- and 6-membered rings.

Reaction between a living polymer and a polyhedral has not been found to require special reaction conditions; simple addition of the desired polyhedral(s) to the vessel containing living polymer generally is sufficient. Attachment of the polyhedral to the polymer chain can be by a covalent bond, optionally a covalent bond between C atoms on the polymer and on the polyhedral radical. The polyhedral radical can be located at a terminus of the polymer, optionally at the end of the longest chain of the polymer. For certain end use applications (e.g., polymers used in tire tread compositions), the polyhedral radical preferably is at a terminus of a substantially linear polymer chain.

By manipulating the molar ratio of the polymer chains to the polyhedral(s), the number of polymer chains bonded to a single polyhedral radical can be controlled. For example, by using ~50%, ~33%, ~25%, ~20%, etc., of the polyhedral molecule(s) calculated to terminate the number of living polymer chains, one can achieve macromolecules that include, respectively, 2, 3, 4, 5, etc., polymers on each polyhedral.

Additionally, by manipulating the equivalents ratio of initiator to polyhedral, control over the ability or tendency of polymers (during processing) to de-couple from the polyhedral(s) to which they are bonded can be achieved. This is in contrast to the all-or-nothing breakdown characteristics observed with common coupling agents such as, e.g., $SiCl_4$ and $SnCl_4$, and provides a means to selectively and controllably introduce uncoupled polymers into a rubber compound. This ability to retain polymer chains in a coupled state prior to compounding but selectively "release" them during compounding can be highly desirable; coupled polymers exhibit desirable cold flow properties while uncoupled polymers act as processing aids that do not tend to exude after curing. Control over de-coupling permits processing variables such as, e.g., Mooney viscosity, to be maintained within desirable ranges while still providing filled compounds that exhibit excellent physical performance properties (e.g., tan δ) when cured. Where this type of controlled de-coupling is desired, an excess of initiator equivalents to polyhedral equivalents typically is employed; common ratios (initiator to polyhedral) can range from, for example, about 2:1 to about 6:1, preferably about 3:1 to about 5:1, with all intermediate ratios being contemplated and disclosed. Excess initiator can result in star-shaped macromolecules, i.e., a polyhedral "hub" with polymer chain "arms". Cage-like structures (e.g., fullerenes and fullerites) might be preferable to the fragmented structures described previously for this particular processing advantage.

Commonly held wisdom is that tan δ (hysteresis) reductions generally correlate with an increase in effective molecular weight of the constituent polymers. For example, coupling agents such as silanes often are used to effectively multiply the molecular weight of living polymers, i.e., two or more polymers are linked through the coupling moiety. However, where a living polymer is reacted with a polyhedral compound, surprisingly an approximately 1:1 ratio of polymer to polyhedral has been found to provide extremely desirable properties. This might be due to interaction among polyhedral-modified polymers; specifically, such polyhedral-modified polymers can tether to one another through their respective polyhedral radicals (by chemical bonding or, perhaps, association) and/or can form into clusters of bonded or associated polyhedral-modified polymers. Macromolecules that include interactions between at least three polyhedral-modified polymers can be particularly advantageous; in these types of clustered or tethered macromolecules, the polyhedral-modified polymers can be arranged essentially linearly ("tethered") or in formats where each polyhedral-modified polymer is attached to or associated with at least two other similar polymers ("clustered").

From the preceding two paragraphs, the ordinarily skilled artisan now can see that a wide range of processing and physical performance properties for filled compounds can be achieved through judicious selection of the equivalent amounts of initiator, monomer, and polyhedral compound employed. The ability of a rubber compound to exhibit excellent physical performance properties while, simultaneously, being easy to process is highly desirable.

No particularly unusual reaction conditions or sequences are believed necessary to react living polymers with polyhedral(s), although exemplary reaction conditions can be found below in the examples.

Polyhedral-modified macromolecules can be further functionalized if desired. As mentioned above, this can occur before or after quenching depending on the particular mechanism employed. (Where functionalization occurs prior to quenching of a living macromolecule, the polyhedral radical is believed to dissipate or delocalize the anionic charge of the living macromolecule.) Further functionalization can be performed where, for example, enhanced interactivity with a particulate filler is desired. Specifically, while a polyhedral-modified polymer exhibits extraordinary interaction with carbon black (and thus significant hysteresis reduction), inclusion of one more functional groups on that same macromolecule can provide additional interaction with carbon black and/or can enhance interaction of the polymer with other particulate fillers (e.g., silica) that may be present. This functionalization typically involves reaction with compounds that include at least one heteroatom, particularly N-containing (e.g., amine) compounds and alkoxysilanes such as methyltrimethoxysilane, tetraethylorthosilicate, 3-aminopropyltriethoxysilane, N-(3-triethoxy-silylpropyl)-4,5-dihydroimidazole (TEOSI), 3-isocyanatopropyltriethoxysilane, n-methylaminopropylmethyldimethoxysilane, n-methylaminopropyltrimethoxysilane, 3-aminopropyltrimethoxysilane, and $C_{15}H_{33}NSiO_3$ (available as S340 from Sigma-Aldrich Co.; St. Louis, Mo.).

In addition to the coupling inherently provided by the described polyhedral compounds described previously, other compounds can be used for coupling or functionalization. Examples include, but are not limited to, one or more of the following: metal or metalloid halides, alkoxysilanes, imines, amides, esters, aldehydes or ketones, (alkyl)ester-carboxylate metal complexes, iso(thio)cyanates, epoxides, and materials defined by the formula $R_nMX_{4-n}$, where R is an organic group, preferably a $C_1$-$C_{10}$ alkyl group; M is Si or Sn; X is a halogen atom; and n is an integer of from 0 to 3. Examples of these latter compounds include $SnCl_4$, $R_2SnCl_2$, and $RSnCl_3$, described in U.S. Pat. No. 5,332,810, the teaching of which is incorporated herein by reference.

Quenched polymers can be functionalized directly with heteroatom-containing compounds including, e.g., primary and secondary amines, optionally including alkyl- or alkoxysilane groups in the same molecule. While primary and secondary amines typically quench living polymers (through hydrogen donation), the amines can react directly with the polyhedral radicals, likely across one of the many double bonds present, so as to form functionalized polyhedral-modified macromolecules.

Functionalized polymers can be utilized in a filled rubber compound (e.g., tread stock) alone or can be blended with any conventionally employed tread stock rubber such as natural rubber and/or non-functionalized synthetic rubbers such as, e.g., one or more of poly(isoprene), SBR, poly(butadiene), butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% by wt. of the total rubber, with the conventional rubber(s) making up the balance of the total rubber. The minimum amount depends largely on the degree of reduced hysteresis desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates which, in turn, combine less strongly into agglomerates. Surface area, as measured by the BET method, gives a reliable measure of the reinforcing character of different silicas; the surface area of silicas preferably is from about 32 to about 400 $m^2/g$, more preferably from about 100 to about 250 $m^2/g$, and most preferably from about 150 to about 220 $m^2/g$. The pH of the silica filler is generally from about 5 to about 7 or slightly over, preferably from about 5.5 to about 6.8.

Silica can be employed in the amount of about 1 to about 100 parts by weight (pbw) per 100 parts of polymer (phr), preferably in an amount from about 5 to about 80 phr. The useful upper range typically is limited by the high viscosity imparted by fillers of this type. Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Degussa Corp. (Parsippany, N.J.), Rhodia Silica Systems (Cranbury, N.J.), and J. M. Huber Corp. (Edison, N.J.).

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m²/g, preferably at least about 35 to about 200 m²/g or higher are preferred; surface area values can be determined by ASTM D-1765 using the cetyltrimethylammonium bromide (CTAB) technique. The carbon blacks may be in pelletized form or an unpelletized flocculent mass, although unpelletized carbon black can be preferred for use in certain mixers.

The amount of carbon black can be up to about 50 phr, with ~5 to ~40 phr being typical. When carbon black is used with silica, the amount of silica can be decreased to as low as about 1 phr; as the amount of silica decreases, lower amounts of processing aids, plus silane if any, can be employed. These are discussed in more detail below.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a silane, e.g., bis[3-(triethoxysilyl)propyl]tetrasulfide, is customary. Generally, the amount of silane that is added ranges between about 4 and 20% by weight, based upon the weight of silica filler present in the elastomeric compound. Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. The additional fillers can be utilized in an amount of up to about 40 phr, preferably up to about 20 phr.

Other conventional rubber additives also can be added. These include, for example, plasticizers, antioxidants, curing agents and the like.

All of the ingredients can be mixed using standard equipment such as, e.g., Banbury or Brabender mixers. These types of aggressive mixing techniques (optionally combined with the use of elevated temperatures) are hypothesized to break some of the bonds or associations between clustered or tethered macromolecules and/or to break the cage-like structure of the polyhedral(s) employed. These types of dissociations are capable of generating de-coupled polymers (as described above) and so-called active sites that are available to react or interact with particulate filler, particularly carbon black. Specifically, while not wishing to be bound by theory, the significant reduction in hysteresis for compositions containing carbon black as a filler is suspected to be due to the opening of double bonds on the polyhedrals, particularly those at the junction of 6-membered ring portions, and subsequent bonding or association of those sites with the carbon black particles.

Reinforced rubber compounds conventionally are cured with about 0.2 to about 5 phr of one or more known vulcanizing agents such as, e.g., sulfur- or peroxide-based curing systems. For a general disclosure of suitable vulcanizing agents, the interested reader is referred to an overview such as that provided in Kirk-Othmer, *Encyclopedia of Chem. Tech.*, 3d ed., (Wiley Interscience, New York, 1982), vol. 20, pp. 365-468.

In addition to the above-described reduction in hysteresis provided to rubber goods produced from compositions that contain the present macromolecules, their use has been found to provide an additional advantage. Specifically, rubber goods made from filled compositions that include these macromolecules have been found to have significantly reduced FCG values. This is particularly true where carbon black is used as a filler, either alone or in conjunction with other particulates. This characteristic is particularly advantageous because compositions need not be modified to include a separate additive such as, e.g., interpolymers of brominated p-methylstyrene and isobutylene, to achieve desirable reductions in FCG.

FCG can be measured by simple visual observation of a cured rubber article. For example, a cured rubber article of a known length can be provided. Spaced inward from one end thereof, a lengthwise slit (running away from the proximate edge) of predetermined length can be made in the article. By subjecting this type of article to repeated stress (e.g., in an FCG testing device) and visually or optically measuring propagation of the precut slit, FCG can be measured. Where the width and thickness of the cured article also are known, average tear energy of the article also can be calculated. See D. G. Young, "Application of Fatigue Methods Based on Fracture Mechanics for Tire Compound Development," *Rubber Chem. and Tech.*, vol. 63, no. 4, 567 (1990).

Rubber goods made from compositions that include the macromolecules have been found to exhibit improvements in cycle life (compared to rubber goods made from compositions not including the macromolecules) on the order of 100%, 125%, 150%, 175%, and even 200%.

The various aspects just described are exemplified in even further detail in the following examples.

EXAMPLES

In the examples, dried glass vessels previously sealed with extracted septum liners and perforated crown caps under a positive $N_2$ purge were used for all preparations. Butadiene (21% by wt. in hexane unless otherwise noted), styrene (33% by wt. in hexane), hexane, n-butyllithium (various concentrations in hexane), oligomeric oxolanyl propanes, hereafter "OOPS" (1.6 M in hexane, stored over $CaH_2$), and butylated hydroxytoluene (BHT) solution in hexane were used. THF was distilled from potassium benzophenone ketyl. Toluene and xylenes (dried using standard techniques) were stored over $CaH_2$.

Commercially available reagents and starting materials included the following, all of which were used without further purification unless otherwise noted:

from ACROS Organics (Geel, Belgium): $C_{60}$ fullerene (99.9% purity); and from Sigma-Aldrich Co.: 1-(3-bromopropyl)-2,2,5,5-tetramethyl-1-aza-2,5-disilacyclopentane, hexamethylcyclotrisiloxane (D3), 1,2-butylene oxide, 3-aminopropyltrimethoxysilane, $CH_3SiCl_3$, $(CH_3)_2SiCl_2$, $SiCl_4$ (99% purity), $SnCl_4$ (99% purity), fullerite mixture ($C_{60}$-to-$C_{70}$ ratio of 9:1, characterized by HPLC), and fluorinated graphite ([F]>61% by wt.).

Testing data in the Examples was performed on filled compositions made according to the formulations shown in Tables 1a and 1b. In these, N-phenyl-N'-(1,3-dimethylbutyl)-p-phenyldiamine acts as an antioxidant while benzothiazyl-2-cyclohexylsulfenamide, N,N'-diphenyl guanidine, and di(phenylthio)acetamide act as accelerators.

TABLE 1a

Compound formulation, carbon black only

| | Amount (phr) |
|---|---|
| Masterbatch | |
| polymer | 100 |
| carbon black (N343 type) | 55 |
| wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| sulfur | 1.3 |
| benzothiazyl-2-cyclohexylsulfenamide | 1.7 |
| N,N'-diphenyl guanidine | 0.2 |
| TOTAL | 174.65 |

TABLE 1b

Compound formulation, carbon black and silica

| | Amount (phr) |
|---|---|
| Masterbatch | |
| Polymer | 100 |
| Silica | 30 |
| carbon black (N343 type) | 35 |
| N-phenyl-N'-(1,3-dimethylbutyl)-p-phenyldiamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| Sulfur | 1.7 |
| benzothiazyl-2-cyclohexylsulfenamide | 1.5 |
| di(phenylthio)acetamide | 0.25 |
| N,N'-diphenyl guanidine | 0.5 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J. J. Brennan et al., *Rubber Chem. and Tech.*, 40, 817 (1967).

Examples 1-6

To a $N_2$-purged reactor equipped with a stirrer was added 1.47 kg hexane, 0.41 kg styrene, and 2.60 kg butadiene. The reactor was charged with 4.3 mL n-butyllithium (1.54 M in hexane), followed by 1.19 mL OOPS (in hexane). The reactor jacket was heated to 50° C. and, after ~22 minutes, the batch temperature peaked at ~64° C. After an additional 10 minutes, the polymer cement was transferred from the reactor to dried glass vessels.

Before being coagulated in isopropanol containing BHT, the samples were terminated with, respectively,
(1) isopropanol (in excess);
(2) fullerite mixture (1:1);
(3) $(CH_3)_2SiCl_2$ (1:2);
(4) $CH_3SiCl_3$ (1:3); and
(5) $SiCl_4$ (1:4).
(Ratios in parentheses are moles of terminating agent to moles of initiator.)

An additional sample (sample 6) was made by combining approximately equal amounts of samples 1 and 3-6 with the goal of providing a blend of 1-, 2-, 3-, and 4-armed polymers. Each sample was drum dried.

Using the formulations shown in Table 1a, vulcanizable elastomeric compounds containing reinforcing fillers were prepared from samples 1-6. Results of physical testing on these compounds are shown below in Table 2.

TABLE 2

Testing data from Examples 1-6

| | 1 | 2 | 3 | 4 | 5 | 6 |
|---|---|---|---|---|---|---|
| $M_n$ (kg/mol) | 99 | 243 | 177 | 239 | 282 | 166 |
| $M_w/M_n$ | 1.03 | 3.92 | 1.06 | 1.10 | 1.15 | 1.30 |
| % coupling | 0 | 82.4 | 92.6 | 95.0 | 94.3 | 67.1 |
| $T_g$ (° C.) | −37.0 | −37.6 | −37.6 | −37.8 | −37.9 | −38.0 |
| Bound rubber (%) | 10.4 | 39.8 | 18.5 | 24.1 | 29.3 | 21.9 |
| 171° C. MDR $t_{50}$ (min) | 2.9 | 3.2 | 2.9 | 3.0 | 2.9 | 2.8 |
| 171° C. MH-ML (kg-cm) | 17.6 | 15.8 | 19.2 | 15.6 | 15.0 | 17.4 |
| $ML_{1+4}$ @ 130° C. | 20.5 | 62.6 | 55.1 | 81.2 | 78.7 | 47.0 |
| 300% modulus @ 23° C. (MPa) | 10.7 | 15.1 | 12.7 | 13.5 | 13.8 | 13.0 |
| Tensile strength @ 23° C. (MPa) | 15.0 | 19.5 | 17.2 | 18.4 | 19.3 | 15.7 |
| Temp. sweep 0° C. tan δ | 0.338 | 0.431 | 0.371 | 0.389 | 0.460 | 0.471 |
| Temp. sweep 50° C. tan δ | 0.378 | 0.227 | 0.325 | 0.247 | 0.258 | 0.306 |
| 50° C. Dynastat tan δ | 0.2576 | 0.1485 | 0.1891 | 0.1766 | 0.1776 | 0.1918 |

Much can be concluded from the data of Table 2, but certain notable points are apparent. For example, the amount of bound rubber in the composition that includes a polyhedral radical-terminated SBR (Ex. 2) is much higher than for any of the other SBR compositions.

Also, the polyhedral radical-terminated SBR has a much higher molecular weight distribution than the other polymer samples, likely indicating that a polyhedral radical can be bound to a varying number of polymer chains compared to a silicon-type coupling agent (Examples 3-5).

However, the tan δ at 50° C. data show that a composition containing a polyhedral radical-terminated polymer (Example 2) can provide significantly greater reduction in hysteresis than would be expected, based on polymer architecture considerations, from a composition containing a multi-armed polymer (Example 5).

Examples 7-11

To a $N_2$-purged reactor equipped with a stirrer was added 1.46 kg hexane, 0.41 kg styrene, and 2.62 kg butadiene. The reactor was charged with 4.6 mL n-BuLi (1.54 M in hexane), followed by 1.50 mL OOPS (in hexane). The reactor jacket was heated to 50° C. and, after ~21 minutes, the batch temperature peaked at ~64° C. After an additional ~15 minutes, the polymer cement was transferred from the reactor to dried glass vessels.

The samples were terminated with, respectively, (7) isopropanol (in excess);

(8) fullerite mixture (1:1);

(9) $CH_3SiCl_3$ (1:3); and

(10) fluorinated graphite (1:1).

(Ratios again are moles of terminating agent relative to moles of initiator.) These were coagulated in isopropanol containing BHT and drum dried.

Using the formulations shown in Table 1a, vulcanizable elastomeric compounds containing reinforcing fillers were prepared from samples 7-10. An additional compound (Example 11) was prepared by combining the same amount of fullerite mixture used in Example 8 into the polymer from sample 9.

Results of physical testing on these compounds are shown below in Table 3.

TABLE 3

Testing data from Examples 7-11

|  | 7 | 8 | 9 | 10 | 11 |
|---|---|---|---|---|---|
| $M_n$ (kg/mol) | 84 | 145 | 197 | 93 | 193 |
| $M_w/M_n$ | 1.03 | 1.48 | 1.09 | 1.14 | 1.10 |
| % coupling | 0 | 66.5 | 94.6 | 23.0 | 94.3 |
| $T_g$ (° C.) | −37.2 | −36.1 | −36.8 | −35.3 | −36.4 |
| 171° C. MDR $t_{50}$ (min) | 3.3 | 3.4 | 2.9 | 3.3 | 3.0 |
| 171° C. MH-ML (kg-cm) | 16.2 | 16.0 | 15.7 | 16.4 | 16.5 |
| $ML_{1+4}$ @ 130° C. | 17.7 | 47.7 | 72.6 | 19.3 | 74.5 |
| 300% modulus @ 23° C. (MPa) | 10.0 | 14.4 | 12.0 | 10.3 | 13.5 |

TABLE 3-continued

Testing data from Examples 7-11

|  | 7 | 8 | 9 | 10 | 11 |
|---|---|---|---|---|---|
| Tensile strength @ 23° C. (MPa) | 16.1 | 20.6 | 18.0 | 15.9 | 19.6 |
| Temp. sweep 0° C. tan δ | 0.215 | 0.274 | 0.231 | 0.216 | 0.231 |
| Temp. sweep 50° C. tan δ | 0.290 | 0.168 | 0.224 | 0.274 | 0.215 |
| 50° C. Dynastat tan δ | 0.2619 | 0.1220 | 0.1828 | 0.2487 | 0.1721 |

While much can be derived or concluded from the data of Table 3, the tan δ at 50° C. data specifically show that a composition containing a polyhedral radical-terminated polymer (Example 8) provided significantly greater reduction in hysteresis than comparable star-shaped polymers (Example 9), graphite-tethered polymers (Example 10), and star-shaped polymers used with free fullerite (Example 11).

Additionally, the same data provide an indication that reduction in hysteresis apparently is greatly enhanced where polyhedral radicals actually are attached to the polymer chains (Ex. 8) rather than just being present in the composition (Ex. 11).

Examples 12-16b

The polymerization procedures described above with respect to Examples 1-6 and 7-11 were in substantial part repeated. The resulting polymer samples were terminated with an excess of isopropanol (sample 12) or reacted with fullerene (samples 13-16, each using a 1:1 molar ratio relative to initiator). Some fullerene-reacted polymer was terminated with isopropanol (sample 13), but portions of the remainder were further reacted with various heteroatom-containing compounds (each using a 1:1 molar ratio relative to initiator) to provide additional functionalization:

(14) 1-(3-bromopropyl)-2,2,5,5-tetramethyl-1-aza-2,5-disilacyclopentane,

(15) hexamethylcyclotrisiloxane, and

(16) 1,2-butylene oxide.

Separate portions of sample 16 were further reacted with, respectively, 3-aminopropyltrimethoxysilane (sample 16a) and 1-(3-bromopropyl)-2,2,5,5-tetramethyl-1-aza-2,5-disilacyclopentane (sample 16b), all acquired from Sigma-Aldrich.

The samples were coagulated and drum dried as described in prior examples.

Using the formulations shown in Tables 1a and 1b, vulcanizable elastomeric compounds containing reinforcing fillers were prepared from the samples. Results of physical testing on these compounds are shown below in Table 4. For those rows that include two data points, the upper is for a Table 1a-type formulation, and the lower is for a Table 1b-type formulation.

TABLE 4

Testing data from Examples 12-16b

| | 12 | 13 | 14 | 15 | 16a | 16b |
|---|---|---|---|---|---|---|
| $M_n$ (kg/mol) | 94 | 191 | 188 | 192 | 191 | 197 |
| $M_w/M_n$ | 1.03 | 1.50 | 1.48 | 1.48 | 1.49 | 1.48 |
| % coupling | 0 | 77.4 | 76.7 | 77.9 | 78.5 | 78.8 |
| $T_g$ (° C.) | −36.3 | −35.4 | −35.5 | −35.4 | −35.6 | −34.7 |
| Bound rubber (%) | 6.5 | 35.5 | 36.5 | 34.4 | 35.3 | 30.6 |
| | 13.0 | 39.1 | 40.3 | 36.8 | 40.6 | 36.3 |
| 171° C. MDR $t_{50}$ (min) | 2.9 | 3.1 | 3.3 | 3.2 | 2.9 | 2.9 |
| | 7.5 | 6.4 | 5.7 | 5.7 | 6.0 | 6.0 |
| 171° C. MH-ML (kg-cm) | 16.6 | 16.5 | 15.8 | 16.0 | 15.9 | 17.0 |
| | 17.7 | 20.5 | 21.4 | 20.2 | 19.8 | 20.5 |
| $ML_{1+4}$ @ 130° C. | 19.1 | 55.5 | 57.6 | 55.2 | 58.3 | 58.0 |
| | 36.2 | 87.6 | 89.3 | 88.5 | 84.0 | 88.8 |
| 300% modulus @ 23° C. (MPa) | 10.3 | 14.9 | 14.9 | 15.4 | 15.2 | 15.4 |
| | 5.9 | 9.9 | 10.7 | 9.7 | 11.0 | 10.8 |
| Tensile strength @ 23° C. (MPa) | 16.7 | 19.5 | 19.5 | 19.4 | 18.6 | 19.2 |
| | 7.4 | 13.8 | 14.4 | 14.0 | 15.5 | 14.0 |
| Temp. sweep 0° C. tan δ | 0.206 | 0.254 | 0.269 | 0.262 | 0.257 | 0.257 |
| | 0.198 | 0.221 | 0.224 | 0.227 | 0.235 | 0.222 |
| Temp. sweep 50° C. tan δ | 0.268 | 0.168 | 0.174 | 0.167 | 0.166 | 0.163 |
| | 0.269 | 0.197 | 0.185 | 0.191 | 0.195 | 0.189 |
| 50° C. Dynastat tan δ | 0.2603 | 0.1311 | 0.1274 | 0.1228 | 0.1296 | 0.1207 |
| | 0.2663 | 0.1723 | 0.1496 | 0.1595 | 0.1510 | 0.1661 |

The data of Table 4 show much of interest. For example, the tan δ at 50° C. data show that compositions containing a polyhedral radical-terminated polymer (Examples 13-16b) can provide significant reductions in hysteresis and that, at least in some circumstances (e.g., Examples 14 and 16a with silica in the filler blend), additional reductions can be achieved through further functionalization of the polymer chain, probably at the polyhedral radical.

Examples 17-19

To a $N_2$-purged reactor equipped with a stirrer was added 2.31 kg hexane and 2.18 kg butadiene. The reactor was charged with 9.82 mL n-butyllithium (1.54 M in hexane), followed by 2.91 mL OOPS (in hexane). The reactor jacket was heated to 50° C. and, after ~18 min., the batch temperature peaked at ~55° C. After an additional 15 minutes, the polymer cement was transferred from the reactor to dried glass vessels.

The polybutadiene samples were terminated (50° C. bath for ~30 minutes) with, respectively,

(17) isopropanol (in excess);

(18) fullerene (1:1); and

(19) fullerite mixture (1:1).

(Ratios again are moles of terminating agent relative to moles of initiator.) These were coagulated in isopropanol containing BHT, then vacuum dried at 40° C. for ~12 hours. The resulting polymers had the properties shown below in Table 5.

TABLE 5

Polymer properties for Examples 17-19

| | 17 | 18 | 19 |
|---|---|---|---|
| $M_n$ (kg/mol) | 29.6 | 67.3 | 61.6 |
| $M_w/M_n$ | 1.03 | 1.49 | 1.37 |
| $T_g$ (° C.) | −43.4 | −40.7 | −42.4 |

The samples were analyzed by GPC using dual detectors, refractive index and UV-visible set at 330 nm; polybutadiene does not absorb at 330 nm, but fullerene- and fullerite-type materials do. Time (in minutes) constituted the x-axis of each detector output, so the detector responses (the y-axes) could be coordinated. Integration of the peak areas in the two traces provided synergistic information about the fractions: the relative amounts of the polymer contained in each could be determined from the refractive index trace and the relative amounts of fullerene/fullerite materials contained in each from the UV-visible trace. For a given fraction, the amounts of polymer and fullerene/fullerite then could be compared to provide an approximation of the number of polymers associated with one polyhedral or vice versa.

The chromatographs for Examples 18 and 19 showed at least three fractions exiting the column at different times, each of which contained significant amounts of material that absorbed at 330 nm, presumed to be polyhedral radical. This observation is not consistent with multiple chains attached to a single polyhedral radical (e.g., a star-shaped polymer) but is consistent with polyhedral radical-terminated polymers associating with one another in the tethered or clustered forms described in the Detailed Description.

Examples 20-25

Two separate polymerizations were performed. The two runs were designed to provide SBRs with number average molecular weights of, respectively, ~130,000 and ~90,000.

As in prior examples, hexane, styrene, and butadiene were added to a $N_2$-purged reactor equipped with a stirrer. The reactor was charged with n-butyllithium (1.54 M in hexane), followed by OOPS (in hexane). The reactor jacket was heated to 50° C. and, after ~24 minutes, the batch temperature peaked. After an additional 15 minutes, the polymer cement was transferred from the reactor to dried glass vessels. Numerical values for the foregoing are provided below in Table 6, split between Examples 20-22 (the ~130K polymer) and Examples 23-25 (the ~90K polymer).

TABLE 6

Polymer reaction variables

|  | 20-22 | 23-25 |
|---|---|---|
| hexane (kg) | 1.35 | 1.19 |
| styrene (kg) | 0.41 | 0.47 |
| butadiene (kg) | 2.72 | 2.83* |
| n-BuLi (mL) | 3.92 | 6.24 |
| OOPS (mL) | 1.10 | 1.65 |
| peak temperature (° C.) | 63 | 69 |

*~22% (by wt.)

The polymer samples were terminated (50° C. bath for ~30 minutes) with, respectively, (20 & 23) isopropanol (in excess);

(21 & 24) $CH_3SiCl_3$ (1:3); and (22 & 25) fullerite mixture (1:1).

(Ratios again are moles of terminating agent relative to moles of initiator.) These were coagulated in isopropanol containing BHT and drum dried. The resulting polymers had the properties shown below in Table 7.

TABLE 7

Polymer properties for Examples 20-25

|  | 20 | 21 | 22 | 23 | 24 | 25 |
|---|---|---|---|---|---|---|
| $M_n$ (kg/mol) | 112 | 274 | 233 | 80 | 194 | 182 |
| $M_w/M_n$ | 1.03 | 1.10 | 1.50 | 1.03 | 1.10 | 1.23 |
| % coupling | 0 | 94.4 | 72.7 | 0 | 95.5 | 79.6 |
| $T_g$ (° C.) | −36.6 | −36.8 | −34.0 | −36.4 | −36.6 | −36.3 |

Using the formulations shown in Table 1a, filled, vulcanizable elastomeric compounds were prepared from the samples. The compounds were prepared in a 300 g mixer (C.W. Brabender Instruments, Inc.; South Hackensack, N.J.) with standard rotor using a two-stage process as set forth in Table 8 below:

TABLE 8

Mixing procedure

| Masterbatch | |
|---|---|
| batch weight (g) | 300-340 |
| mixing time (min) | 3-6 |
| drop temperature (° C.) | 150-175 |
| Final batch | |
| batch weight (g) | 300-340 |
| mixing time (min) | 1.5-3 |
| drop temperature (° C.) | 90-110 |

The compounds were sheeted and cured in a mold at 171° C. for ~15 minutes.

From the cured compounds were die cut samples for FCG testing; each sample was ~20.3 cm (8 in.) long. A razor blade was used to create a lengthwise cut of ~40 mm in each sample.

Each sample was tested at ambient temperature on a CRT #3 MTS TestStar™ instrument (MTS Systems Corp.; Eden Prairie, Minn.) at 10% strain. The tests were performed at 5 Hz for the entire cycle (including stretch/release/rest time) and 40 Hz for the stretch/release portion of the cycle. A CCD camera was used to monitor and record crack growth.

The results are provided below in Table 9. Blank cells indicate that data was not collected at a given kilocycle point.

TABLE 9

FCG Data for Examples 23-25

| | $D_c/D_n$ (nm/cycle) | | | | | |
|---|---|---|---|---|---|---|
| kilocycles | 20 | 21 | 22 | 23 | 24 | 25 |
| 10 | 253 | | 129 | 156 | 38 | 30 |
| 20 | 159 | | 116 | 155 | 124 | 23 |
| 25 | | 262 | 110 | | | |
| 30 | 112 | | 95 | | 107 | |
| 40 | 121 | | 83 | 102 | 107 | 18 |
| 60 | 143 | | 66 | 93 | 80 | 29 |
| 70 | 133 | | 60 | | | |
| 75 | 120 | | 56 | | | |
| 80 | 110 | | | 77 | 82 | 33 |
| 100 | | | | 71 | 90 | 30 |
| 120 | | | | 88 | 91 | 27 |
| 140 | | | | 83 | 88 | 24 |
| 160 | | | | 85 | 94 | 23 |
| 180 | | | | 91 | 96 | 26 |
| 200 | | | | 87 | 94 | 29 |
| 220 | | | | 85 | | 27 |
| 230 | | | | 87 | | |
| 240 | | | | | | 37 |
| 250 | | | | | 110 | 41 |

Tear energy was calculated from crack growth length, sample thickness, and sample width (based on average of measurements at 5 points for each sample). Tear energy results are summarized below in Table 10, with the Average $D_c/D_n$ being the calculated mean of the data points from Table 9 for each example.

TABLE 10

Average Tear Energy ($E_T$) Data for Examples 20-25

|  | 20 | 21 | 22 | 23 | 24 | 25 |
|---|---|---|---|---|---|---|
| Avg. $D_c/D_n$ (nm/cycle) | 137 | 262 | 56 | 97 | 92 | 29 |
| Avg. $E_T$ (kJ/m²) | 2.52 | 2.49 | 2.42 | 2.15 | 2.27 | 2.06 |

The data of Tables 9 and 10 indicate that polyhedral-terminated polymers exhibit significantly reduced FCG compared to non-functionalized and star-shaped polymers.

Examples 26-29

To a $N_2$-purged reactor equipped with a stirrer was added 1.79 kg hexane and 0.38 kg styrene, and 2.31 kg butadiene (22.0% by wt. in hexane). The reactor was charged with 5.27 mL n-butyllithium (1.54 M in hexane), followed by 1.36 mL OOPs (1.6 M in hexane). The reactor jacket was heated to 50° C. and, after ~25 minutes, the batch temperature peaked at ~57° C. After an additional 15 minutes, the polymer cement was transferred from the reactor to dried glass vessels.

In a 50° C. bath for 30 minutes, the samples were allowed to react with, respectively,

(26) fullerite mixture (1:3);

(27) fullerite mixture (1:5);

(28) $SiCl_4$ (0.25 M in hexane); and

(29) $SnCl_4$ (0.25 M in hexane).

(Ratios for samples 27 and 28 are moles of fullerite to moles of BuLi initiator.)

These were coagulated in isopropanol containing BHT and then vacuum dried, similarly to that which has been described in previous examples.

Using the formulation from Table 1a, vulcanizable elastomeric compounds containing reinforcing fillers were prepared from the samples. Table 11 contains processing and physical testing data for these compounds.

TABLE 11

Testing data from Examples 26-29

|  | 26 | 27 | 28 | 29 |
|---|---|---|---|---|
| $M_n$ (kg/mol) | 158 | 193 | 282 | 202 |
| $M_w$ (kg/mol) | 235 | 304 | 323 | 285 |
| $M_w/M_n$ | 1.49 | 1.57 | 1.15 | 1.24 |
| $T_g$ (° C.) | −33.0 | −32.5 | −32.9 | −32.6 |
| % coupling | 76.5 | 82.4 | 94.3 | 89.3 |
| $ML_{1+4}$ @ 130° C. | 50.4 | 54.8 | 78.7 | 26.7 |
| 50° C. RDA strain sweep (5% strain) tan δ | 0.1363 | 0.1557 | 0.1893 | 0.1615 |

A comparison of the data of Table 11 shows that Examples 26 and 27 (which include fullerite functionalization) have lower Mooney viscosity and tan δ (i.e., greater hysteresis reduction) values than do Examples 28 and 29 (which utilized standard coupling agents). This combination of processability and performance is both unusual and highly desirable.

We claim:

1. A macromolecule comprising a plurality of polyhedral-modified polymers, each of said polymers comprising a single polyhedral radical chemically bonded thereto at a terminus, each of said plurality of polymers being bonded to or associated with at least one other of said plurality of polymers through their respective polyhedral radicals.

2. The macromolecule of claim 1 wherein said macromolecule comprises at least three of said polyhedral-modified polymers.

3. The macromolecule of claim 2 wherein each of said polyhedral-modified polymers is bonded to or associated with at least two other of said polyhedral-modified polymers through their respective polyhedral radicals.

4. A composition comprising at least one reinforcing filler and the macromolecule of claim 3.

5. A method of inhibiting the growth of fatigue-induced cracking in a rubber article, comprising forming a rubber article from the composition of claim 4.

6. The method of inhibiting the growth of fatigue-induced cracking in a rubber article of claim 5 wherein said rubber article is vulcanized.

7. A composition comprising at least one reinforcing filler and the macromolecule of claim 1.

8. A composition comprising at least one reinforcing filler and the macromolecule of claim 2.

9. The macromolecule of claim 2 wherein at least one first polyhedral-modified polymer is bonded to or associated with at least two second polyhedral-modified polymers through the polyhedral radical of said first polyhedral-modified polymer.

10. A composition comprising at least one reinforcing filler and the macromolecule of claim 9.

11. The composition of claim 10 further comprising a vulcanizing agent.

12. A vulcanizate provided from the composition of claim 11.

13. The macromolecule of claim 1 wherein each of said polymers comprises polyene mer and, optionally, vinyl aromatic mer.

14. The macromolecule of claim 13 wherein each of said polymers has a 1,2-microstructure of from about 25 to 65% based on total polyene content.

15. The composition of claim 4 further comprising a vulcanizing agent.

16. A vulcanizate provided from the composition of claim 15.

17. The composition of claim 7 further comprising a vulcanizing agent.

18. A vulcanizate provided from the composition of claim 17.

19. The composition of claim 8 further comprising a vulcanizing agent.

20. A vulcanizate provided from the composition of claim 19.

* * * * *